United States Patent Office 3,242,353
Patented Mar. 22, 1966

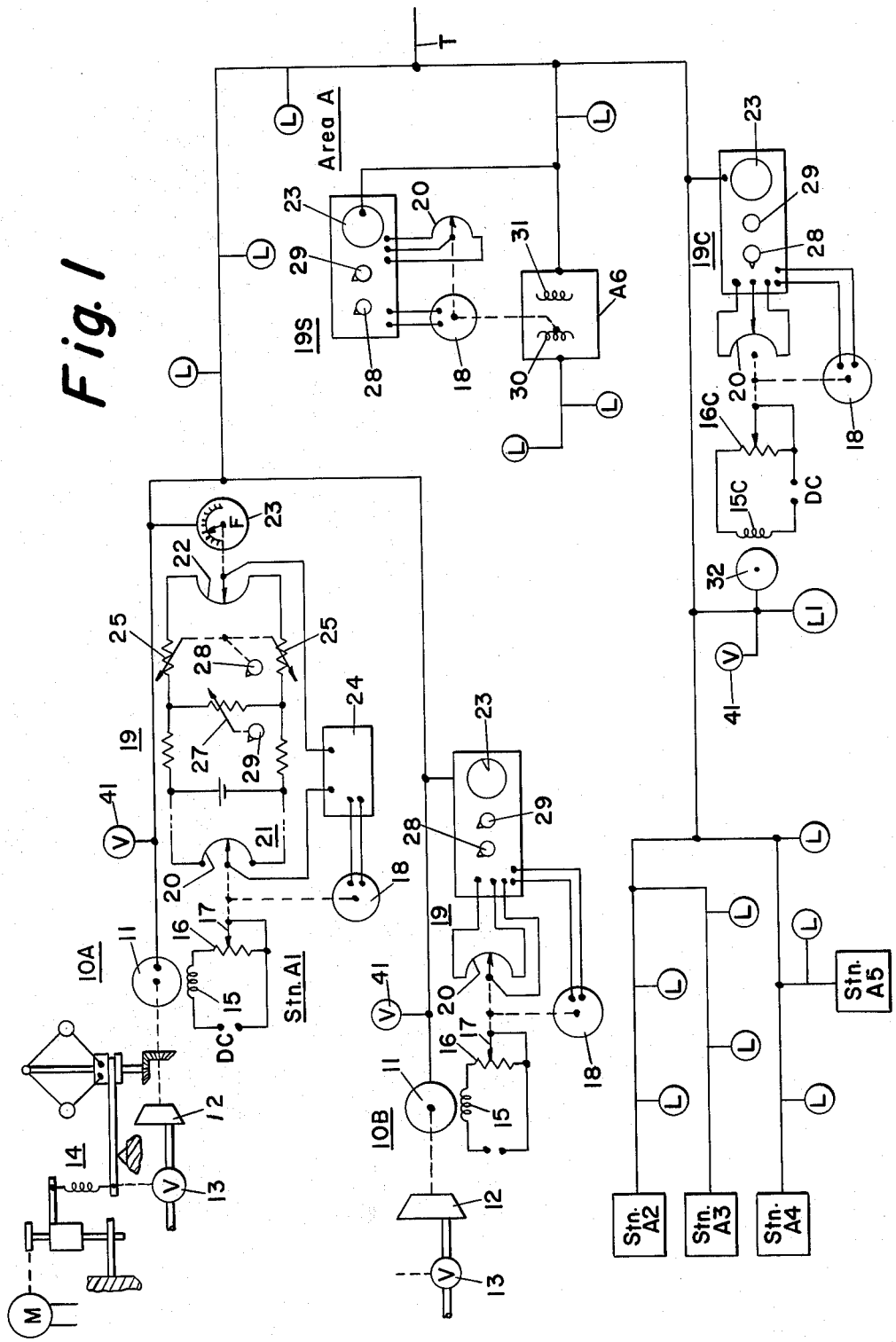

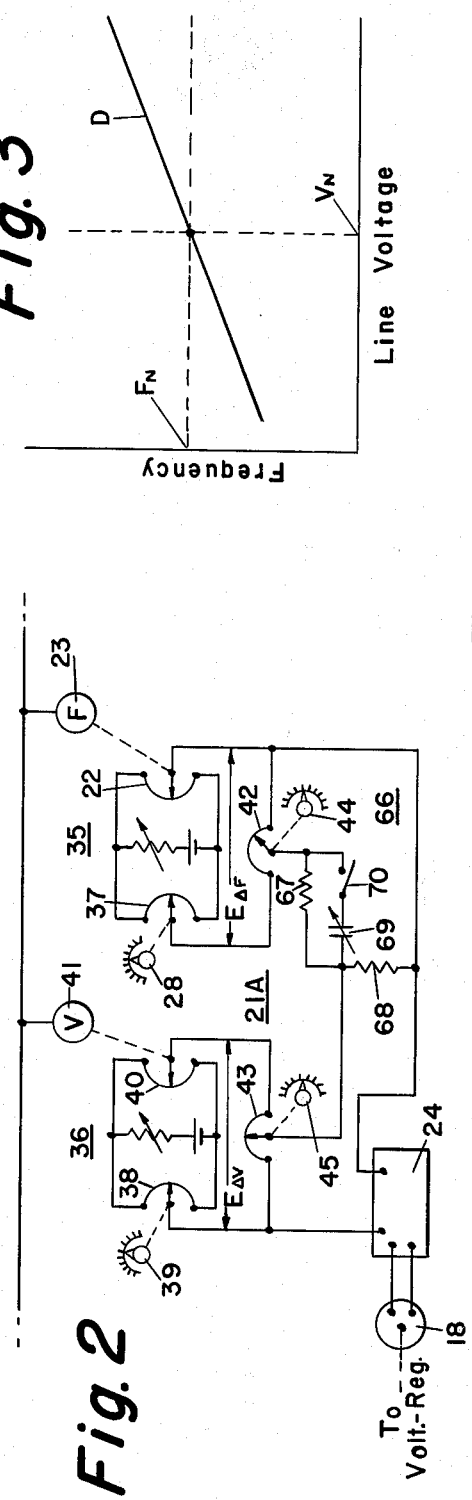
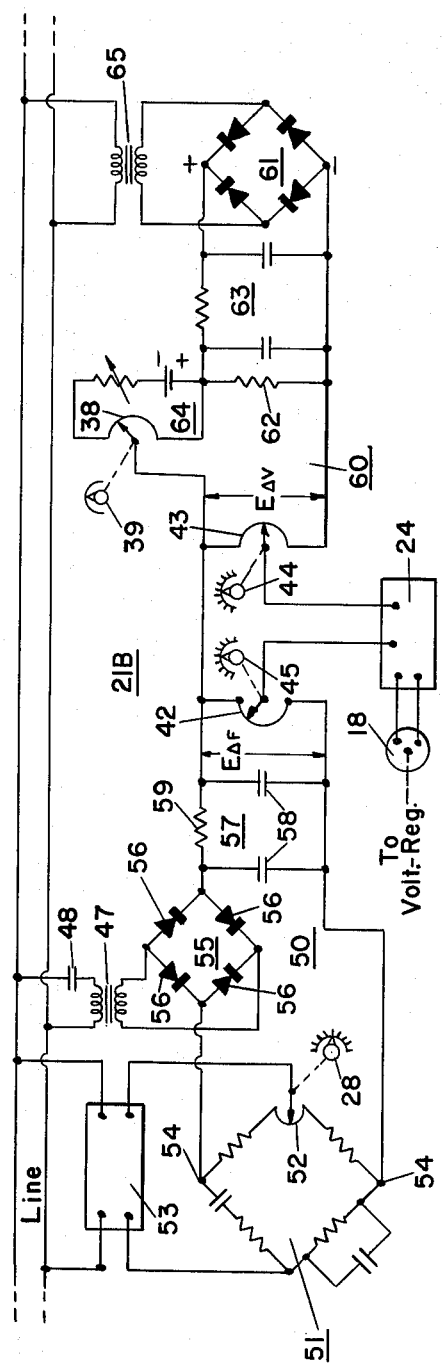

3,242,353
DAMPING ARRANGEMENTS FOR ELECTRICAL GENERATING AND DISTRIBUTION SYSTEMS
Edward S. Bristol and Albert J. Williams, Jr., Philadelphia, Pa., assignors to Leeds and Northrup Company, Philadelphia, Pa., a corporation of Pennsylvania
Filed Feb. 2, 1962, Ser. No. 170,568
11 Claims. (Cl. 307—102)

This invention relates to arrangements for increasing the effective damping of electrical generating and distribution systems.

Because of the characteristics of its generating units and of its motor and other loads, every generating and distribution system has inherent damping. When, for example, any of the generators has a temporary excess of driving torque, the resulting tendency for the electrical frequency of an alternating-current system to increase is opposed by the tendency of the connected load to draw increased power upon increase of frequency. When, on the other hand, any of the generators has a temporary deficiency of driving torque, the resulting tendency of the frequency to decrease is opposed by the tendency of the connected load to draw decreased power upon decrease of frequency.

In accordance with the present invention, such inherent damping is augmented by providing means responsive to deviations of the frequency from standard or normal frequency and effective to change the line voltage in the same sense as the frequency deviations, i.e., to increase the line voltage upon increase of frequency and to decrease the line voltage upon decrease of frequency. In addition, the line voltage may be varied as a time function of frequency such as the rate of change of frequency. More specifically, all or a suitable number of generating units of the system may be provided with a frequency-responsive voltage regulator effective to vary the generator field excitation upon change in system frequency; alternatively, or in addition, some or all substations or other points of the system may be equipped with induction regulators or tap-changing transformers subject to adjustment by means responsive to system frequency; alternatively, or in addition, one or more of the feeders of the system may be connected to a synchronous condenser whose field excitation is adjustable by means responsive to frequency.

This invention further resides in load-frequency control arrangements having features of novelty and utility hereinafter described and claimed.

For a more detailed understanding of the invention, reference is made to the attached drawings showing the invention as applied to generating units, substations and feeders of an area of a generating and distribution system.

FIG. 1 schematically illustrates an area of power-generating and distribution systems with provisions of various frequency-controlled voltage-regulating arrangements;

FIG. 2 schematically illustrates a modification of control circuitry shown in FIG. 1;

FIG. 3 is an explanatory figure referred to in discussion of FIGS. 2 and 4; and

FIG. 4 schematically illustrates another modification of control circuitry shown in FIG. 1.

Referring to FIG. 1, the area A comprising the generating stations A1–A5, the substation A6 and various loads L is interconnected by one or more tie-lines T to another or other areas of a system for generating and distributing electrical power. In such a system, each area is committed to control its generation to supply power to its local load and in event of tie-line interconnection to at least one other area to receive or supply a scheduled interchange of power over the tie-lines. During oscillatory tie-line power or energy swings, which may be initiated by a load or generation change in one area, the average system frequency is common to areas interconnected by the tie-line but in the area at one end of the tie-line the voltage vector alternately advances and lags in phase the voltage vector in the area at the opposite end of the tie-line. Such alternate advance and lag in phase of voltage vectors may also occur between remote portions of the same area. The persistence and amplitude of accompanying power swings are influenced by the inherent damping of the system as determined by the characteristics of the motor and other loads and of the electrical generating units and associated governing and control action. The inherent damping of a particular system may be insufficient to hold the oscillatory power swings to suitably low magnitude.

As will now be explained, the inherent damping is enhanced to predetermined desired extent by varying the line voltage in response to change of frequency and in such sense that both the frequency-change and voltage-change tend to increase the change in power consumed in the load. Various arrangements for accomplishing this result are shown in FIG. 1.

The first arrangement, utilized with the generating units 10A, 10B of station A1, controls the line voltage by varying generator field excitation in response to changes in system frequency. Each of the generating units 10A, 10B comprises an alternator 11 and a prime mover 12. The input to each prime mover is controlled by a gate or valve 13 whose position is regulated by a speed-responsive governor 14 which may be set manually or by automatic control means normally to provide a given prime mover torque under predetermined steady-state conditions of frequency and/or area load; as exemplary of automatic control means, reference may be had to U.S. Letters Patent 2,754,429, 2,773,994 and 2,836,730. The alternator field winding 15 is supplied with direct current from a suitable source, commonly an exciter driven by the prime mover of the alternator. The field current is adjustable as by rheostat 16 having a relatively movable contact 17.

The motor 18 coupled to the rheostat 16 is a reversible motor controlled by suitable frequency-responsive apparatus to form therewith a frequency-responsive voltage regulator 19 for the associated generating unit. Specifically, the motor 18 of the regulator is coupled to the rebalancing slidewire 20 of a balanceable bridge network 21. A second slidewire 22 of network 21 is positioned in accordance with frequency by a suitable frequency-responsive device exemplified by frequency-meter 23. The amplifier 24 in response to unbalance of frequency-responsive network 21 effects energization of reversible motor 18 in sense to effect a rebalancing adjustment of slidewire 20 and a corresponding adjustment of the field rheostat 16 of the associated alternator 11. Any suitable amplifier-motor arrangement, such for example as shown in U.S. Letters Patent 2,593,950 and 2,668,264 may be used.

The complementarily adjustable resistances 25 respectively connected to opposite ends of slidewire 22 are adjustable as by knob 28 to predetermine the setting of slidewire 20, and therefore the field excitation, at normal system frequency. The shunt resistance 27 of network 21 is adjustable as by knob 29 to predetermine the relationship between the range of movement of slidewire 20 and the frequency span corresponding with the range of movement of slidewire 22. Otherwise stated, with the frequency at normal value, the field excitation of the alternator 11 can be adjusted to a desired normal value by varying the "off-set" resistances 25, and the extent to which the field excitation is changed therefrom for any given frequency deviation can be predetermined by adjusting the "span" resistance 27.

In response to an increase of frequency, the meter 23, or equivalent frequency-responsive device, unbalances network 21 in such sense that the motor 18 in effecting the rebalancing adjustment of slidewire 20 repositions the field rheostat 16 in sense tending to increase the output voltage of the associated alternator 11. Conversely, when the frequency decreases, the frequency-responsive voltage regulator 19 changes the field excitation in sense to tend to decrease the output voltage of the associated generating unit of station A1. Each generating unit of station A1 so controlled contributes to enhancement of the inherent damping of area A for reasons previously explained. The extent to which each unit contributes may be varied by resetting the span resistance 27 of the associated frequency-responsive voltage regulator 19.

Any one or more of the generating stations of area A or of other areas of the distribution system may have the field excitation of any one or more of its generating units so controlled by a frequency-responsive voltage regulator to reduce the power swings in the associated area and over the tie-lines.

Alternatively, or in addition, the outgoing line voltage of one or more substations of an area may be controlled by a frequency-responsive voltage regulator to augment the inherent damping of the distribution system. For example, as shown in FIG. 1, the substation A6 which receives power from the area network comprises an induction regulator or tapped winding transformer exemplified by the inductively-coupled transformer windings 30, 31. The movable coil or core, in the case of an induction regulator, or the tap switch in the case of a tapped transformer, is coupled to the actuating or rebalancing motor 18 of the frequency-responsive voltage regulator 19S shown in block but whose internal circuitry may be the same as that herein previously or later described. The regulator motor 18 upon increase of frequency adjusts the induction regulator or tapped transformer in sense to increase the voltage of the outgoing line of the substation; and upon decrease of frequency adjusts the voltage transformation ratio in sense to decrease such outgoing voltage. With this arrangement, there is no direct or immediate effect of the regulator adjustment upon the line voltage as measured at the loads connected to lines on the input side of the substation. However, the change in output voltage of the substation has an immediate effect complementing that of a frequency change upon the power consumed by loads connected to the output side of the substation.

When the area has a substantial inductive load, as is usually the case, the line voltage may be controlled in response to frequency changes by varying the field excitation of one or more synchronous condensers connected across the power lines. As is known to those skilled in the art, a synchronous condenser is a synchronous motor generally operated without mechanical load and whose field is over-excited to make it take a leading line current and so neutralize the lagging current of inductive loads on the line. In FIG. 1, the load L1, for example, may be assumed to be a large industrial plant having many induction motors supplied through a line extending to the area network. The synchronous condenser 32 connected to this line is excited by field winding 15C. The field rheostat 16C for adjusting the field current of synchronous condenser 32 is suitably coupled to motor 18 of the frequency-responsive voltage regulator 19C. In response to an increase or positive deviation of frequency, the voltage regulator 19C through its motor 18 and field rheostat 16C further increases the field excitation of condenser 32. In response to a decrease or negative deviation of system frequency, the frequency-responsive voltage regulator 19C decreases the extent of overexcitation of the field of synchronous condenser 32. In both cases, the tendency for the synchronous condenser to change the line voltage complements the effect of the concurrent frequency change to enhance the inherent damping of the distribution system so to reduce the load swings in the area and over the tie-lines. The knob 28, or equivalent, of the voltage regulator 19C provides for adjustment of the required over-excitation of the field of the synchronous condenser at normal system frequency and the knob 29 can be preset to predetermine the extent to which the field excitation is changed for any given change in frequency.

The motor 18 of any one or more of the voltage regulators of FIG. 1 may be controlled by the circuitry shown in FIG. 2. In this arrangement, the motor 18 is coupled, as in FIG. 1, to the movable element of the field rheostat of an alternator or synchronous condenser or to the movable element of an induction regulator or similar device, but is not coupled to a rebalancing impedance in the input circuit of amplifier 24. In FIG. 2, the input circuit 21A of the amplifier includes two networks 35, 36 whose outputs respectively represent the deviations from normal frequency and from normal line voltage.

Specifically, the network 35 includes a slidewire 37 whose position relative to its contact is set, as by knob 28, to correspond with normal frequency and a slidewire 22 whose position relative to its contact varies with actual frequency as measured by the frequency-meter or high-speed frequency recorder 23. When the actual frequency corresponds with normal frequency, the output voltage $E_{\Delta f}$ of frequency-responsive network 35 is zero. When the actual frequency is above or below normal, the output voltage $E_{\Delta f}$ corresponds in sense and magnitude with the frequency deviation.

The network 36 includes a slidewire 38 whose position relative to its contact is set, as by knob 39, to correspond with normal line voltage and a slidewire 40 whose position relative to its contact varies with the actual line voltage as measured by volt-meter 41. When the actual line voltage corresponds with normal line voltage, the output voltage $E_{\Delta v}$ of the voltage-responsive network 36 is zero. When the actual line voltage is above or below normal, the output voltage $E_{\Delta v}$ of network 36 corresponds in sense and magnitude with the voltage deviation.

The voltage-divider resistors 42, 43 respectively in the output circuits of networks 35, 36 may be set, as by knobs 44, 45, so that any preselected fractions of voltages $E_{\Delta f}$ and $E_{\Delta v}$ may be algebraically added to provide the input signal of amplifier 24. It is thus possible to adjust the slope of the frequency/voltage response characteristic D (FIG. 3) of the regulator and so predetermine the extent to which the associated power-generating or distributing equipment contributes to enhancement of the damping of its area. It is to be noted that the input to amplifier 24 is zero for all concurrent values of actual frequency and actual line voltage which fall on the selected characteristic D and that, accordingly, the sense in which the motor 18 of the voltage regulator operates at any given time depends upon the sense of the algebraic difference of the then existing magnitudes of both voltages $E_{\Delta f}$ and $E_{\Delta v}$.

As shown in FIG. 2 and as may be done in FIG. 4, the input circuit 21A of amplifier 24 also includes means for producing a control effect which varies as a time function of frequency. Specifically, the resistor-capacitor network 66 comprising the voltage-divider resistors 67, 68 and capacitor 69 provides not only a proportionality factor but also a time factor whereby the variation of frequency relative to its set-point includes a time function. With switch 70 open, the voltage across resistor 68 is proportional to the deviation of frequency from the set point. With switch 70 closed to shunt the resistor 67 by capacitor 69, the voltage across resistor 68 additionally varies as a function of the rate of change of frequency from the set point. The capacitor 69 is adjustable to change the time constant of network 66 without changing the proportionality factor of the voltage divider, 67, 68.

In the arrangement shown in FIG. 4, the input circuit of amplifier 24 again includes two networks whose outputs respectively correspond with the deviations from normal frequency and normal line voltage to effect operation of motor 18 of any of the voltage regulators of FIG. 1 in sense dependent upon the algebraic difference of the existing magnitudes of $E_{\Delta f}$ and $E_{\Delta v}$.

Specifically, the network 50 for producing a voltage $E_{\Delta f}$ corresponding in sense and magnitude with deviation from normal frequency includes a Wien bridge 51 including impedance means, exemplified by slidewire 52, which may be set by knob 28 for null output of the bridge at normal frequency. The bridge 51 is energized from the power line through a suitable constant output voltage device 53 which may be of type such as shown in U.S. Letters Patent 2,501,263. It is thus insured that the input voltage of the bridge is essentially constant throughout a substantial range of variation of line voltage. Upon deviation from normal frequency, the bridge 51 is unbalanced and its output voltage between terminals 54, 54, is of magnitude and phase corresponding with the magnitude and sense of the frequency deviation. The output circuit of the frequency-responsive bridge 51 includes an electronic switch or modulator bridge 55 comprising four diodes 56 poled as shown. The power terminals of the modulator are connected, as by transformer 47 and a phase-shifter exemplified by capacitor 48, to the power line so that the switching voltage applied to bridge 55 is of the same frequency as the output voltage of bridge 51 and is either in-phase or 180° out-of-phase therewith depending upon the sense of unbalance of bridge 51. Thus, the voltage $E_{\Delta f}$ across the output resistor 42 of network 50 is a unidirectional voltage of polarity and magnitude corresponding with the sense and extent of unbalance of the frequency-responsive bridge 51. The filter 57 comprising capacitors 58 and resistor 59 is for smoothing out the frequency-ripple component of voltage $E_{\Delta f}$.

The network 60 for producing a voltage $E_{\Delta v}$ corresponding in sense and magnitude with the deviation from normal line voltage comprises a rectifier network 61 energized from the power line through transformer 65. Thus, the voltage applied to resistor 62 through the filter 63 is a unidirectional voltage of magnitude varying with the changes in line voltage. The voltage appearing across resistor 62 is opposed to a reference voltage of magnitude corresponding with desired normal line voltage and derived from the potentiometer circuit 64. The slidewire 38 of potentiometer 64 is adjustable relative to its contact, as by knob 39, to a setting corresponding with normal line voltage.

With the line voltage at normal value, the voltage drop across resistor 62 is equal and opposite to the preselected output voltage of potentiometer 64 and no voltage drop appears across the output resistor 43 of network 60. When the actual line voltage is above or below normal, the unbalance current traversing resistor 43 produces a voltage $E_{\Delta v}$ of polarity and magnitude corresponding with the sense and magnitude of the line-voltage deviation.

The output resistors 42, 43 of networks 50, 60 are voltage dividers adjustable relative to their contacts, as by knobs 44, 45, so that any preselected fractions of voltages $E_{\Delta f}$ and $E_{\Delta v}$ may be algebraically combined, as in the arrangement of FIG. 2, to provide the input signal for amplifier 24. Thus, as with the circuitry of FIG. 2, the slope of the frequency/voltage response characteristic D of the regulator may be preselected to predetermine the extent to which the associated power-generating or distribution unit contributes to the damping of its area for suppressing power swings including oscillatory power swings over the tie-line connection to another area which preferably also has generating or distribution units similarly equipped with controlled voltage regulators.

It shall be understood that the invention is not limited to the particular arrangement herein specifically described but comprehends modifications and equivalents thereof within the scope of the appended claims.

What is claimed is:

1. In a system including alternators for generating A.C. power distributed over power lines at line voltage to electrical loads, an arrangement for augmenting the damping of said system comprising a frequency-responsive network coupled to one of said lines and including impedance means preset for balance of said network at normal frequency and effective to produce a signal in sense and magnitude representative of an existing deviation from normal frequency, a voltage-responsive network coupled to one of said lines and including impedance means preset for balance of said network at normal line voltage and effective to produce a signal in sense and magnitude representative of an existing deviation from normal line voltage, and means responsive to the algebraic difference of said signals for varying the line voltage in sense to reduce said difference to zero.

2. In a system comprising prime mover-alternator units furnishing A.C. power over a power line to connected loads, means for regulating the inputs of individual prime movers so that each provides for the associated alternator a driving torque varying as a function of frequency, and frequency-responsive means coupled to said line for changing the field-excitation of individual alternators in sense to counteract the effect upon frequency of an excess or deficiency of driving torque by the effects of line voltage as changed by the change of field-excitation upon the power consumed by the connected loads.

3. In a system comprising prime mover-alternator units furnishing A.C. power over a power line to connected electrical loads, means responsive to the speed of individual prime movers for regulating their respective prime-mover inputs so that the driving torque for each of the associated alternators varies as a function of power-line frequency, and means coupled to said line and responsive to power-line frequency for varying the line voltage in sense to counteract the effect upon frequency of an excess or deficiency of driving torque by the effects of the variation in line voltage produced by said frequency-responsive means upon the power consumed by the connected loads.

4. Apparatus for enhancing the damping of an A.C. power-generating and distributing area including a power line supplied from one or more alternators, said apparatus comprising means for establishing a desired magnitude of power-line voltage in said area for normal line-frequency, and frequency-responsive means coupled to said line for varying said established desired magnitude of line voltage as a predetermined function of line frequency.

5. Apparatus for control of an A.C. power-generating and distributing area including a power line supplied from one or more alternators, said apparatus comprising means for establishing a desired magnitude of line voltage for normal line-frequency, and means coupled to said line and responsive to changes in line frequency as reflecting the difference between power being supplied to said area and power being consumed in and extracted from said area for varying said established desired magnitude of line voltage as a predetermined function of line frequency.

6. Apparatus for enhancing the damping of an A.C. power-generating and distributing network including alternators and power lines connected thereto, said apparatus comprising means for adjusting line voltage, and frequency-responsive means coupled to one of said lines for controlling said voltage-adjusting means in sense to increase the power consumed in the network upon increase of frequency and in sense to decrease the power consumed in said network upon decrease of frequency.

7. In a system comprising alternators for generating A.C. power distributed over power lines to electrical loads, an arrangement for augmenting the damping of said system comprising means for producing an effect corresponding with normal frequency, means coupled to one of said lines for producing an effect corresponding to existing frequency, means for producing an effect corresponding to normal line voltage, means coupled to one of said lines for producing an effect corresponding to existing line voltage, means for combining said effects and producing a control signal, and means responsive to said control signal to vary the line voltage to maintain a desired frequency-voltage relation.

8. In a system including alternators for generating A.C. power distributed over power lines at line voltage to electrical loads, an arrangement for augmenting the damping of said system comprising means coupled to one of said lines for producing a signal in sense and magnitude varying in accordance with deviations from normal frequency, means coupled to one of said lines for producing a signal in sense and magnitude varying in accordance with deviations from normal line voltage, and means responsive to the algebraic difference of said signals for varying the line voltage in sense to reduce said difference to zero, said last-named means including means for varying the field-excitation of one or more alternators of the system in response to changes in frequency.

9. In a system including alternators for generating A.C. power distributed over power lines at line voltage to electrical loads, an arrangement for augmenting the damping of said system comprising means coupled to one of said lines for producing a signal in sense and magnitude varying in accordance with deviations from normal frequency, means coupled to one of said lines for producing a signal in sense and magnitude varying in accordance with deviations from normal line voltage, and means responsive to the algebraic difference of said signals for varying the line voltage in sense to reduce said difference to zero, said last-named means including voltage-transforming means having a movable element whose position determines its voltage-transformation ratio and which is adjusted by frequency-responsive means.

10. In a system including alternators for generating A.C. power distributed over power lines at line voltage to electrical loads, an arrangement for augmenting the damping of said system comprising means coupled to one of said lines for producing a signal in sense and magnitude varying in accordance with deviations from normal frequency, means coupled to one of said lines for producing a signal in sense and magnitude varying in accordance with deviations from normal line voltage, and means responsive to the algebraic difference of said signals for varying the line voltage in sense to reduce said difference to zero, said last-named means including a synchronous condenser connected to one of said supply lines and having its field-excitation varied by frequency-responsive means.

11. In a system including alternators for generating A.C. power distributed over power lines at line voltage to electrical loads, an arrangement for augmenting the damping of said system comprising means coupled to one of said lines for producing a signal in sense and magnitude varying in accordance with deviations from normal frequency, means coupled to one of said lines for producing a signal in sense and magnitude varying in accordance with deviations from normal line voltage, means responsive to the algebraic difference of said signals for varying the line voltage in sense to reduce said difference to zero, and time-constant means for introducing into said difference a signal component varying as a time-function of frequency-deviation.

References Cited by the Examiner

UNITED STATES PATENTS

| | | | |
|---|---|---|---|
| 2,103,774 | 12/1937 | Friedlander | 307—59 |
| 2,395,517 | 2/1946 | Stoller | 318—318 |
| 2,524,166 | 10/1950 | Gartner | 322—24 |
| 2,558,729 | 7/1951 | Buechler | 290—40.2 |
| 2,707,241 | 4/1955 | Griscom | 323—48.5 |
| 2,721,305 | 10/1955 | Steinitz | 322—24 |
| 2,728,044 | 12/1955 | Stearley | 322—24 |
| 2,798,997 | 7/1957 | Curtis | 318—318 |
| 2,803,793 | 8/1957 | Wibel | 318—314 |
| 2,907,942 | 10/1959 | Law | 322—32 |
| 3,060,366 | 11/1962 | Foerch | 322—32 |
| 3,164,769 | 1/1965 | Anderson | 322—32 |

LLOYD McCOLLUM, *Primary Examiner.*

ROBERT C. SIMS, *Examiner.*